United States Patent Office 2,702,253
Patented Feb. 15, 1955

2,702,253

SURFACE METALLIZING METHOD

Emil Axel Bergström, Skarsatra, Lidingo, Sweden, assignor to Svenska Aktiebolaget Gasaccumulator, Lidingo, Sweden, a corporation of Sweden No Drawing. Application November 1, 1950, Serial No. 193,532

4 Claims. (Cl. 117—47)

The invention refers to the metallizing of surfaces and is applicable to all kinds of surfaces, metallic, as well as non-metallic, such as glass. It is particularly suitable for coating a surface with a metal of the platinum group Ru, Rh, Pd, Os, Ir, Pt, the iron group (Fe, Co, Ni) or one of the metals Cr, Al, Mg, and Mn.

The essential feature of the invention is that the surface is first coated with a thin base layer comprising a metal from one of the groups indicated above. Experiments have shown that all of these metals are not equivalent for a base layer. It appears that the action of the layer is associated with the power of absorption or the catalytic properties of the metal thereof. Thus, palladium is markedly superior to the other metals and is also characterized by a very high power of absorption relative to hydrogen.

By way of example the method of the invention will now be described applied to the case when it is desired to coat a glass object with cobalt, the base layer being palladium. The method may then be as follows:

The object, whose surface should of course be well cleansed, is steeped momentarily in a dilute acid solution of stannous chloride. A suitable concentration is about 1 to 10 percent by weight of $SnCl_2$ and a suitable degree of acidity is pH=1 to 5, the optimal value being about pH=2.5; however, these values are not critical. The object is then rinsed, whereupon it is momentarily steeped in a solution of palladious chloride ($PdCl_2$). Also palladic chloride ($PdCl_4$) or some other palladium salt could be used. In this case also a pH value within the range indicated (about 2.5) is most suitable. As to the concentration of the palladious chloride solution, it is suitable for it to be appreciably lower than that of the stannous chloride for best results. A value of between ½ and 1 percent by weight is suitable. When the thinnest possible base coating has been applied in this way, the object is rinsed with extreme care so as to remove any trace of the salt solutions earlier applied.

The desired metallization may now take place simply as a steeping of the object in a salt of the metal which is to form the coating, i. e., in the assumed example cobalt. The thickness of the coating is then determined by the duration of the steeping process as well as by the temperature of the salt solution. The temperature also influences the quality of the coating, the best results in this regard appearing to accrue from temperatures within the approximate bounds of 60 and 95 degrees centigrade.

To judge from actual experiments the action of the base layer is somewhat like that of a catalyst in that it facilitates the precipitation on it of the coating metal. This accounts for the advantageousness of the method in metallizing with just those metals that are themselves catalytically active, since it is to be expected that a previously deposited layer of such a metal will facilitate the further deposition of additional layers of the same or another metal from the groups mentioned.

The cobalt salt solution should suitably not be neutral but should be either acid or alkaline and contain a reducing agent in sufficient concentration to prevent reduction of the deposited metal. Sodium hypophosphite or pyrogallol may be used, for example, in the concentration of between 1 and 10 percent by weight. For the rest, the concentration of the solution is not very critical with regard to either metal salt or reducing agent.

What is claimed is:

1. A method of metallizing a surface which does not reduce stannous chloride with at least one desired coating metal selected from the group consisting of Os, Ir, Pt, Rh, Ru, Pd, Fe, Co, Ni, Cr, Al, Mg, and Mn, comprising the steps, first, of steeping said surface in a dilute solution of $SnCl_2$ and then rinsing the same, second, of steeping the same in a dilute solution of a chloride of palladium, and third, of steeping the same in a solution containing a salt of said desired metal.

2. A method according to claim 1, in which said second step comprises momentary steeping of said surface in an acid solution of a chloride of palladium.

3. A method according to claim 1, in which said first step comprises steeping said surface in a dilute acid solution of $SnCl_2$.

4. A method according to claim 1, in which said second step comprises steeping said surface in a solution of a palladium salt at a temperature between 60 and 95 degrees centigrade.

References Cited in the file of this patent

UNITED STATES PATENTS

| Number | Name | Date |
|---|---|---|
| 2,030,476 | Smith | Feb. 11, 1936 |
| 2,303,871 | Walker | Dec. 1, 1942 |
| 2,430,581 | Pessel | Nov. 11, 1947 |
| 2,454,610 | Narcus | Nov. 23, 1948 |
| 2,464,143 | Martinson | Mar. 8, 1949 |
| 2,532,283 | Brenner | Dec. 5, 1950 |
| 2,532,284 | Brenner | Dec. 5, 1950 |